United States Patent [19]

McDowell

[11] Patent Number: 5,031,574
[45] Date of Patent: Jul. 16, 1991

[54] CONTROL SYSTEM FOR POULTRY HOUSE VENTILATION CURTAINS

[76] Inventor: Jack C. McDowell, Rte. 3, Box 385, Dunlap, Tenn. 37327

[21] Appl. No.: 549,264

[22] Filed: Jul. 6, 1990

[51] Int. Cl.$^5$ ............................. F24F 9/00; A01K 1/00
[52] U.S. Cl. .......................................... 119/21; 160/331
[58] Field of Search ............................. 119/21, 22, 16; 160/331, 338

[56] References Cited

U.S. PATENT DOCUMENTS

| | | | |
|---|---|---|---|
| 1,027,028 | 5/1912 | Bailey | 160/331 |
| 3,042,001 | 7/1962 | Dubie et al. | 119/21 |
| 3,429,298 | 2/1969 | Thomason | 119/21 |
| 3,474,761 | 10/1969 | Thomason | 119/21 |
| 3,915,377 | 10/1975 | Sutton | 119/21 |
| 4,428,278 | 1/1984 | Sutton | 119/21 |

*Primary Examiner*—John G. Weiss
*Attorney, Agent, or Firm*—Alan Ruderman

[57] ABSTRACT

A poultry house having ventilation windows with curtains movable vertically relative to the windows to open the windows incrementally has a control cable associated with each curtain for pulling the curtain upwardly by curtain cords connecting the control cable to the curtain to close the ventilation through the window or to release the pull on the curtain to permit the curtain to drop incrementally and open the window. Each control cable is trained about a control pulley mounted on a power driven rod and is connected at one end to a manually rotatable winch. Other pulleys guide the cable to the control pulley and from the control pulley to the winch. In normal power operation the power driven rod pulls or releases the cable by retraction or extension, but in the event of a power failure the manually operable winch may be utilized to raise and lower the curtains. All of the curtains may be raised and lowered simultaneously during power operation, or may be raised and lowered individually manually by a winch associated with each curtain. The power driven rod may be the piston rod of a hydraulic cylinder, the screw of a screw jack or a rack of a rack and pinion system.

6 Claims, 2 Drawing Sheets

CONTROL SYSTEM FOR POULTRY HOUSE VENTILATION CURTAINS

BACKGROUND OF THE INVENTION

This invention relates to the raising and lowering of ventilation curtains on poultry houses and the like, and more particularly to the combination of power driven means and manual means for raising and lowering such curtains, the manual means being utilized in the event of a power failure for incrementally raising and lowering the curtains.

A poultry house wherein chickens or the like are confined while they are raised for market must be maintained under reasonably controlled temperature and ventilation conditions. Such poultry houses have screened windows in the sidewalls with a weather impervious curtain movably disposed for covering each window to close off ventilation and prevent the houses from becoming too cold, and for opening the windows when the temperature within the house becomes too warm. Conventionally, the curtains are raised and lowered to close and open the windows and this may occur in increments dependent upon the temperature within the chicken houses and the ventilation required to provide necessary fresh air for the health of the poultry.

In the early prior art the curtains were raised and lowered manually by means of winches and pulleys, examples of such devices being illustrated in Wyman U.S. Pat. No. 1,054,071 and Haggard U.S. Pat. No. 3,478,805. Because of the frequency of the required raising and lowering of the curtains, automatic electric power operated means have been provided. Examples of such power operated means in the prior art are illustrated in Dubie et al. U.S. Pat. No. 3,042,001 and Thomason U.S. Pat. No(s). 3,429,298 and 3,474,761. Additionally, ventilation fans are provided for ensuring adequate air flow through the houses. However, should a power failure or the like occur with the curtains in the closed position, the temperature and ventilation within the poultry house can rapidly reach conditions resulting in injury or death to the poultry. Thus, the prior art has proposed safety devices for automatically releasing a normally operable winch which has been used to move the curtains to the closed position. For example, in Smith U.S. Pat. No. 3,973,173 and in Sutton, Jr. U.S. Pat. No(s). 3,915,377 and 4,428,278 a safety device is actuated upon failure of the electrical system to release a winch and allow it to free-wheel to permit the curtains to drop and open the windows to the poultry house. In no known prior art is a combination power driven means and manually operable means utilized for controlling the raising and lowering of the curtains such that normally the curtains are raised and lowered automatically by power driven means, but in the event of a power failure, the curtains may be raised and lowered incrementally manually.

SUMMARY OF THE INVENTION

Consequently, it is a primary object of the present invention to provide a combination power drive means and manual means for raising and lowering the ventilation curtains of a poultry house, the manual means acting as a backup or override for the power means when a power failure has occurred.

It is another object of the present invention to provide apparatus for raising and lowering the ventilation curtains of a poultry house by power operated means which in the event of a power failure may be overridden to permit raising and lowering of the curtains manually.

It is a further object of the present invention to provide manually operable control apparatus for raising and lowering the ventilation curtains of a poultry house, the apparatus being connected in combination with power driven means normally utilized for raising and lowering the curtains and being operable upon the occurrence of a failure of the power system.

It is a still further object of the present invention to provide a combination of power driven means and manual means for raising and lowering the ventilation curtains of a poultry house incrementally, the power drive means normally being utilized for raising and lowering of the curtains incrementally under thermostatic control, the power drive means including a pulley about which is trained a cable that is connected to each curtain, the pulley being movable by the power drive means for raising and lowering the curtains, the manual means including a winch for each cable and to which the cable is connected for manually moving the cable about the pulley for raising and lowering the curtain independent of the power drive means.

Accordingly, the present invention provides a combination of power driven means and manual means for raising and lowering the curtains at each side of a chicken house incrementally. A power driven member preferably in the form of a hydraulic cylinder is normally utilized to control the raising and lowering of the curtains in increments, thermostatic means operating to drive a motor for driving the power means. The power driven member supports a first plurality of pulleys, there being preferably one pulley for each curtain, and a cable extends about each pulley and guide means and is operatively connected to a respective curtain so that as the pulley is moved by the power driven member the curtains may be raised or lowered selectively. One end of each cable is connected to a manually operable winch or other reeling device which can be utilized to pay-out or reel-in the cable selectively about the respective pulley irrespective of the disposition of the pulley so as to raise or lower the curtain when the power system has failed. Thus, a normally power operated curtain raising and lowering system has an override for each of the curtains so that each curtain may be raised and lowered individually manually in the event of a power failure or the like.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
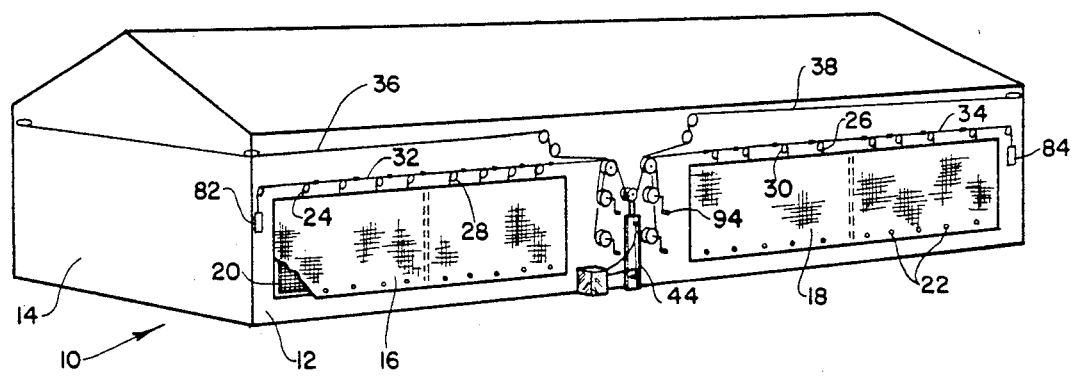
FIG. 1 is a perspective view of a poultry house partly broken away having ventilation curtain raising and lowering apparatus constructed in accordance with the principles of the present invention.
Figure 2:
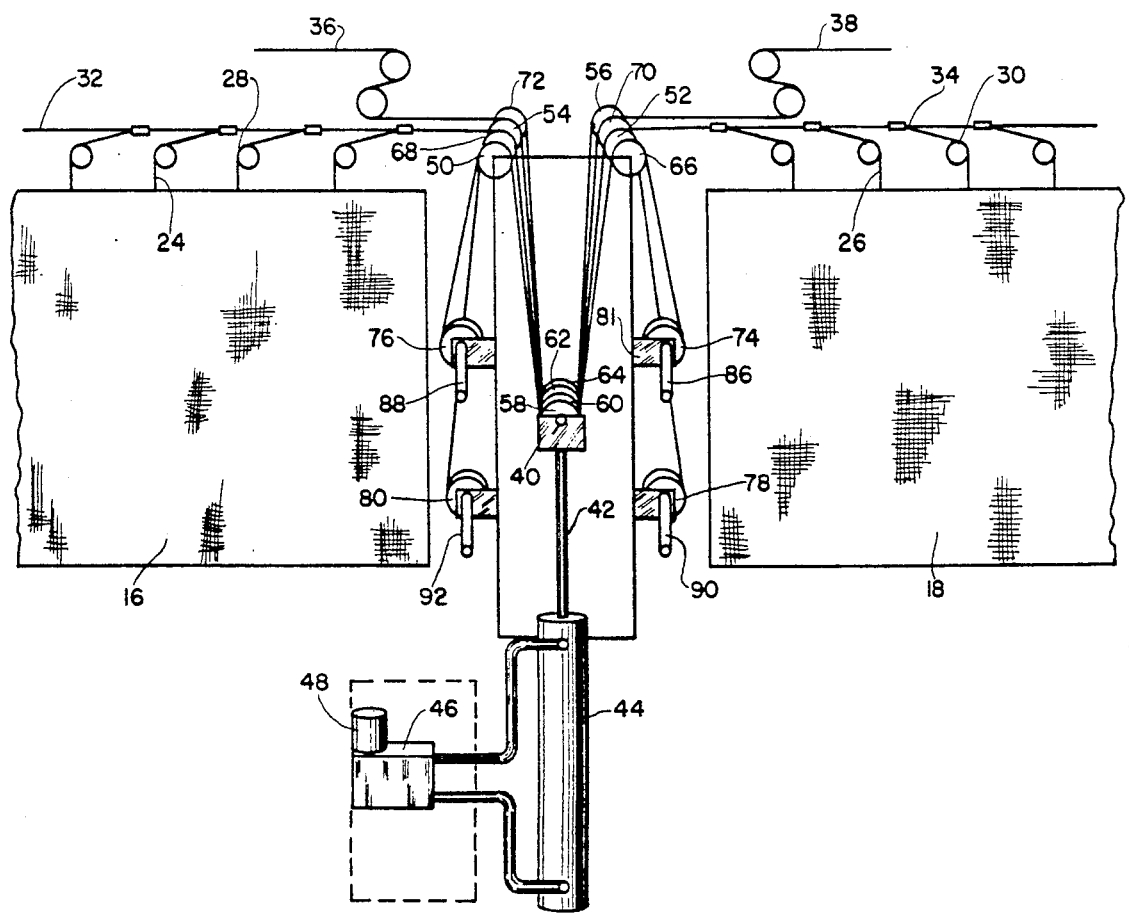
FIG. 2 is an enlarged partial side elevational view of the curtain raising and lowering apparatus illustrated in FIG. 1.

Referring now to the drawings, a poultry house 10 is illustrated, the house having side walls 12 which may be as long as 500 feet, and end walls 14, only one of the side and end walls being illustrated. Each side wall 12 has a plurality of flexible ventilation curtains 16, 18 disposed for opening and closing screened ventilation windows 20 extending lengthwise a substantial portion of the walls 12. The curtains, as illustrated, are normally secured to the walls 12 below the respective windows by conventional means such as rivets 22 or the like and are attached to one end of a plurality of curtain cords 24, 26 at the top of the respective curtains, the curtains being lowered to open the respective ventilation window 20 or raised to close the window.

The curtain cords 24, 26 corresponding to each curtain 16, 18 and the curtains on the other side of the house are trained about respective pulleys 28, 30 and similar pulleys on the other side and are secured at their other ends to a respective cable 32, 34, 36, 38 corresponding to each respective curtain. Conventionally, for an automatic curtain raising system each cable 32, 34, 36, 38 is trained about respective pulleys, one of which is carried by a carrier 40 secured on a movable rod 42 with the free end of the cable tied to a fixed member carried by the house 10. The rod 42 may be the output rod of a hydraulic cylinder 44 as illustrated, the cylinder being supplied with hydraulic pressure by a pump 46 driven by a motor 48 and having valving for porting hydraulic fluid to either the head end or the tail end of the cylinder under the control of a thermostat mounted within the poultry house and transmitting signals through relays to the motor and pump conventionally so that when the temperature within the house rises above a preselected desired temperature, the rod 46 is withdrawn into the cylinder to pull the cables 32, 34, 36, 38 and raise the respective curtains. If the temperature is too cool within the poultry house the rod 42 is extended and the curtains are lowered to provide ventilation. Timing means may also conventionally be used for raising and lowering the curtains incrementally, the timing means acting to stop the fluid pumping action after a selected period of operation and if the temperature has not yet attained the desired value, the timing means is reactivated to permit the pump to again control the rod 42. Alternatively, the rod 42 may be the screw of a screw jack or a rack of a rack and pinion system controlled by the thermostat.

As aforesaid, in the event of an electrical power failure, and/or of a hydraulic system failure, the curtains can remain in the raised position, or if the electrical control has a fail safe circuit, the curtains in that case may be automatically lowered to the fully opened position relative to the windows. In either situation damage can be done to the poultry within the house. Thus, in accordance with the present invention a manual override system is provided in conjunction with the automatic raising and lowering apparatus.

Accordingly, in the present invention the respective cables 32, 34, 36, 38 are disposed over respective pulleys 50, 52, 54, 56, trained about control pulleys 58, 60, 62, 64 rotatably carried by the carrier 40 and thereafter trained about other respective pulleys 66, 68, 70, 72 and connected at one end to a respective reeling member such as a winch 74, 76, 78, 80 fixedly mounted on the house 10 or a bracket 81 secured to the house. The other end of each cable may be connected to a weight or other tensioning or pay-out device, only two of which 82 and 84 being illustrated. Each winch may be manually turned by a respective crank 86, 88, 90, 92 to reel-in or pay-out the corresponding cable 32, 34, 36, 38 against the tensioning action of the respective weight or the like so as to raise or lower the curtains selectively manually. The manual raising or lowering of the curtains may be performed with the rod 42 in any disposition so that if a power failure has occurred the curtains may be selectively raised or lowered from the position at failure, and any curtain may be manually raised or lowered in this manner individually in increments.

Figure 3:
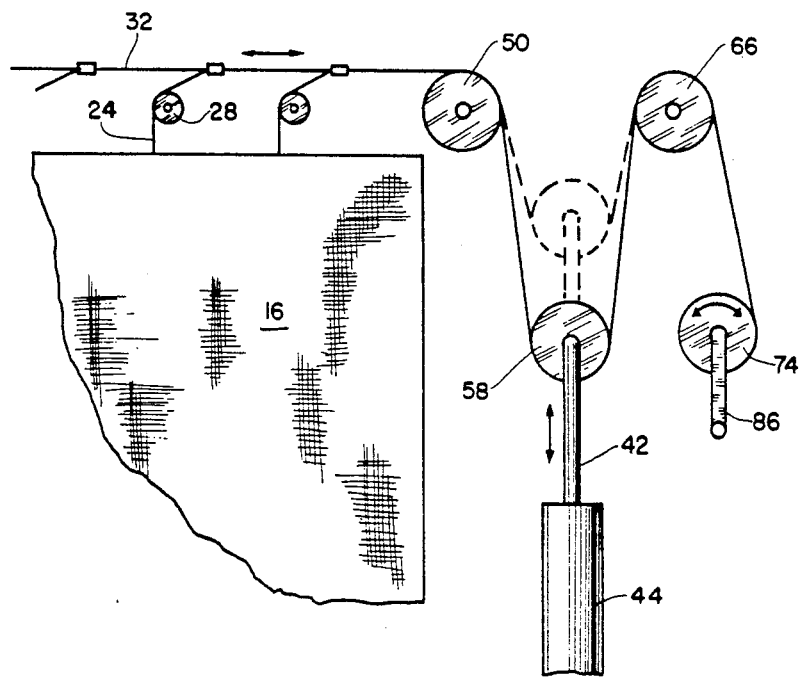
FIG. 3 is a fragmentary diagrammatic illustration of the curtain raising and lowering apparatus associated with one curtain.

With reference to FIG. 3, the raising and lowering operation of each curtain may be readily understood in regard to curtain 16. Normally the curtain 16 may be raised and lowered under thermostatic control automatically by the power cylinder 44. As the output rod 42 is withdrawn into the cylinder 44, the pulley 58 in the carrier 40 at the end of the rod is pulled downwardly and, since the end of the cable is secured to the winch, the pulley pulls the cable 32 with it thereby resulting in the cable being drawn from the left to the right as viewed in FIG. 3 over the pulley 50. This causes the curtain cords 24 to be pulled upwardly about the pulleys 28 resulting in the curtain 16 being drawn upwardly toward the window closing position. When the pulley is pulled down the length of the cable between the winch 74 and the pulley is increased. When the rod 42 is extended outwardly from the cylinder 44, the length of cable between the winch and pulley is reduced as the weight 82 or other tensioning means pulls the cable to the left as viewed in FIG. 3 and, as the curtain cords 24 are relaxed about the respective pulleys 28, the curtain 16 drops downwardly to open the window. During this power operation the cable 32 between the pulley 66 and the winch 74 is not movable since the end of the cable is connected to the winch 74.

When a power failure has occurred, whether or not there is automatic curtain lowering circuitry in the control system, the rod 42 and thus the pulley 58 become immobile, although, of course, the pulley 58 is rotatable relative to the carrier 40 and thus the rod 42. The crank 86 may thereafter be manually engaged to rotate the winch 74 and either reel-in or pay-out the cable 32 about the pulleys 66, 58 and 50. When the winch is rotated clockwise as viewed in FIG. 3, the cable is wound onto the drum of the winch and the curtain 16 is raised toward the window closing position. As the cable is unreeled from the winch, the curtain is lowered to open the window. If desired this manual operation may be performed with the pulley 58 in any position to adjustably trim the curtains while the curtains are under power control. Once the curtain is disposed in the desired position relative to the window, the crank may be locked by any conventional means to secure the winch against inadvertent undesirable rotation. For example, a simple rope or chain 94 connected to the house 10 and looped about the crank handle as illustrated in FIG. 1 may be used for this purpose. A more elaborate locking means may be a locking pawl mounted on the winch carrying bracket 81 acting in conjunction with a ratchet connected to the crank 86 and rotatable therewith, such structure being well known in the art as illustrated in the aforesaid Sutton U.S. Pat. No. 4,428,278, and for clarity of presentation such structure is not illustrated.

Each of the other curtains is controlled in the same manner as the curtain 16. In each case the power driven operation is effected by the movable control rod 42 to move all of the respective other pulleys 60, 62, 64 simultaneously with the pulley 58 and the cables 34, 36, 38 simultaneously with the cable 32. When manual operation is desired or required the respective winch 76, 78, 80 is rotated to reel-in or pay-out the cables about the respective pulleys. Thus, cable 34 is guided by the pulleys 52, 60, 68; the cable 36 is guided by pulleys 54, 62, 70; and the cable 38 is guided about the pulleys 56, 64, 72. Consequently, the control cable for each curtain is guided about the linearly movable pulley and guided to a respective individual winch and may be raised or lowered manually incrementally independently of the other curtain.

Figure 4:
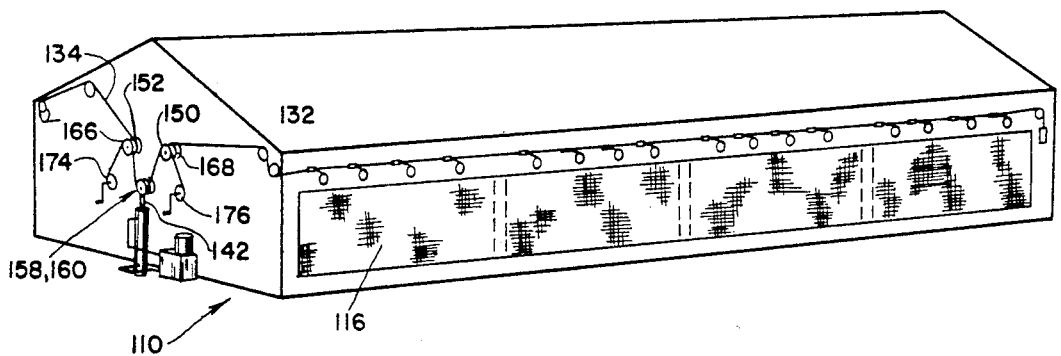
FIG. 4 is a view similar to FIG. 1 having the ventilation curtain raising and lowering control apparatus mounted at the end of the poultry house.

FIG. 4 illustrates a poultry house 110 wherein the curtain raising and lowering control apparatus is mounted at the end of the building rather than in the center of the building as in FIG. 1. Thus, only one cable 132 is necessary to control the curtains 116 on the front side of the building and one cable 134 is necessary to control the curtains on the remote side. This requires that only two pulleys 158, 160 be carried by the movable control rod 142, and only two winches 174, 176 be utilized in conjunction with corresponding guide pulleys 150, 166 and 152, 168 for manual raising and lowering of the respective curtain. In all other respects the apparatus is the same as heretofore described.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a poultry house having ventilation windows and a plurality of curtains disposed for closing and opening respective windows to control the flow of air through the windows, a control cable for each curtain, and curtain cords connecting each cable to the respective curtain, the combination of power means for normally controlling each cable to raise and lower the corresponding curtain for closing and opening the respective window and manual means for controlling each cable upon the occurrence of a power failure, said combination including a power driven linearly movable control rod, a pulley corresponding to each curtain operatively connected to said control rod for linear movement therewith and for rotation relative thereto, manually rotatable reeling means corresponding to each cable fixedly disposed relative to said pulley connected to an end of a respective cable for reeling-in and paying-out said respective cable selectively, guide means between each reeling means and respective curtain cords for guiding a respective cable about the corresponding pulley so that each cable is guided by and moves with the corresponding pulley as said corresponding pulley moves linearly with said control rod, whereby the length of each cable between the corresponding pulley and the respective reeling means may be varied with the movement of said control rod to lower and raise said curtains simultaneously when said reeling means is locked or each reeling means may reel-in or pay-out the respective cable relative to the corresponding pulley for selectively raising and lowering any one of said curtains individually manually.

2. In a poultry house as recited in claim 1, wherein said control rod is movable vertically.

3. In a poultry house as recited in claim 2, wherein said guide means comprises a pair of pulleys spaced on opposite sides of the line of movement of said control rod.

4. In a poultry house having a plurality of windows and a respective curtain for overlaying each window to close said window and for moving vertically relative to said window to open and close the window for controlling the communication of air therethrough, control means for moving each curtain vertically to control communication of air through the respective window, said control means comprising a control cable corresponding to each curtain, curtain cords connected to each cable and to the respective curtain, fixed guide means for guiding said curtain cords for movement between the respective cable and the corresponding curtain, a fixedly disposed manually rotatable reeling means connected to an end of each cable for reeling-in and paying-out a respective cable to raise and lower the corresponding curtain selectively, a respective guide member about which a corresponding cable is trained disposed intermediate each reeling means and the respective curtain cords, and a power driven rod movable relative to said reeling means for carrying and moving said guide members relative to said reeling means to vary the length of cable between each reeling means and the corresponding guide member for pulling and releasing all of said cables selectively, whereby each curtain may be raised and lowered selectively by the respective reeling means or all curtains may be raised and lowered together by said power driven rod.

5. In a poultry house as recited in claim 4, wherein said guide member comprises a pulley rotatably supported on said rod.

6. In a poultry house as recited in claim 5, wherein said rod is driven vertically.

* * * * *